United States Patent
Anderson

(10) Patent No.: US 11,903,370 B2
(45) Date of Patent: Feb. 20, 2024

(54) ILLUMINATING FISHING DEVICE

(71) Applicant: Sabrina Anderson, San Diego, CA (US)

(72) Inventor: Sabrina Anderson, San Diego, CA (US)

(*) Notice: Subject to any disclaimer, the term of this patent is extended or adjusted under 35 U.S.C. 154(b) by 0 days.

(21) Appl. No.: 17/574,333

(22) Filed: Jan. 12, 2022

(65) Prior Publication Data

US 2023/0217911 A1     Jul. 13, 2023

(51) Int. Cl.
*A01K 87/00*     (2006.01)
*A01K 89/00*     (2006.01)
*A01K 97/00*     (2006.01)

(52) U.S. Cl.
CPC ............ *A01K 87/007* (2013.01); *A01K 89/00* (2013.01); *A01K 97/00* (2013.01)

(58) Field of Classification Search
CPC ........ A01K 85/01; A01K 85/00; A01K 97/00; A01K 99/00; A01K 89/0111; A01K 89/0178; A01K 89/01082
USPC ...................................... 43/17.5, 17.6, 4, 4.5
See application file for complete search history.

(56) References Cited

U.S. PATENT DOCUMENTS

| | | | | |
|---|---|---|---|---|
| 4,369,486 A * | 1/1983 | Pool | ...................... | G02B 6/0005 362/120 |
| 4,617,751 A * | 10/1986 | Johansson | .............. | A01K 91/00 43/17.5 |
| 5,172,508 A * | 12/1992 | Schmidt | ................ | A01K 87/007 43/18.1 R |
| 5,414,951 A * | 5/1995 | Martin | .................... | A01K 91/00 43/17.5 |
| 6,193,387 B1 * | 2/2001 | Schlichting | ............. | F21V 33/00 43/17.5 |
| 6,694,665 B1 * | 2/2004 | Moran | ................... | D07B 1/148 43/17.5 |
| 6,964,509 B2 * | 11/2005 | Gozum | ................... | F21L 14/02 242/380 |
| 7,347,607 B1 * | 3/2008 | Hook | ..................... | A01K 89/00 43/17.5 |
| 7,824,054 B2 * | 11/2010 | Rigsbee, Jr | ............ | A01K 97/00 362/249.02 |
| 7,841,757 B1 * | 11/2010 | Hook | ................... | A01K 89/015 43/17.5 |
| 8,104,220 B2 * | 1/2012 | Cobb | ................... | A01K 87/007 43/17 |

(Continued)

FOREIGN PATENT DOCUMENTS

WO     WO-2007055328 A1 *     5/2007     ........... A01K 87/007

*Primary Examiner* — Darren W Ark
*Assistant Examiner* — Kevin M Dennis
(74) *Attorney, Agent, or Firm* — The Iwashko Law Firm, PLLC; Lev Ivan Gabriel Iwashko

(57) ABSTRACT

An illuminating fishing device removably connected to at least a portion of a fishing rod, the illuminating fishing device including an illuminating fishing line to illuminate in response to receiving at least one beam of light therein, and a reel assembly, including a reel body, an illuminating line spool disposed on at least a portion of the reel body to store the illuminating fishing line therein and illuminate a surrounding area therefrom, such that the illuminating line spool emits the at least one beam of light into the illuminating fishing line, and an illuminating bail disposed on at least a portion of the reel body to illuminate the surrounding area.

1 Claim, 2 Drawing Sheets

(56) References Cited

U.S. PATENT DOCUMENTS

| | | | | |
|---|---|---|---|---|
| 8,595,972 B2* | 12/2013 | Foss | .................... | A01K 87/007 |
| | | | | 43/18.1 R |
| 9,021,737 B1* | 5/2015 | Bradstreet | .............. | A01K 87/00 |
| | | | | 43/25 |
| 9,179,659 B1* | 11/2015 | Berthiaume | ......... | A01K 97/125 |
| 9,277,738 B2* | 3/2016 | Tschantz | ................ | A01K 97/00 |
| 9,420,775 B1* | 8/2016 | Ridler | .................. | A01K 97/125 |
| 2004/0055204 A1* | 3/2004 | Allie | .................... | A01K 87/007 |
| | | | | 43/18.1 R |
| 2008/0250691 A1* | 10/2008 | Barnes | ................. | A01K 97/125 |
| | | | | 43/18.1 R |
| 2010/0098948 A1* | 4/2010 | Nakanishi | .............. | A01K 91/00 |
| | | | | 428/394 |
| 2010/0281753 A1* | 11/2010 | Gonzagowski | ...... | A01K 87/007 |
| | | | | 43/17 |
| 2011/0162253 A1* | 7/2011 | Cobb | .................. | A01K 87/007 |
| | | | | 43/25 |
| 2015/0116992 A1* | 4/2015 | Massey | .................... | F21L 4/02 |
| | | | | 362/184 |
| 2015/0223438 A1* | 8/2015 | Tschantz | ............. | A01K 87/007 |
| | | | | 43/44.88 |

* cited by examiner

ILLUMINATING FISHING DEVICE

BACKGROUND

1. Field

The present general inventive concept relates generally to fishing, and particularly, to an illuminating fishing device.

2. Description of the Related Art

Fishing is a popular sport that requires skill and patience to be successful in catching a fish. Fishing can be performed during any time of the day. However, fishing at night can be more difficult due to a limited amount of light emission. Moreover, typical fishing lines are nearly impossible to see during the night and/or during any other period of low light. A person attempting to fish at night and/or an area of low light is at risk of falling and/or tripping over a fishing line, which may result in the person falling into the water based on locale and/or potential injury.

Some people fish on a boat, while others fish on land. Regardless of location, light may or may not be available. The availability of an external light source does not guarantee the person will see the fishing line before contacting it.

Therefore, there is a need for an illuminating fishing device to facilitate fishing at night and improving visibility of the fishing line.

SUMMARY

The present general inventive concept provides an illuminating fishing device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an illuminating fishing device removably connected to at least a portion of a fishing rod, the illuminating fishing device including an illuminating fishing line to illuminate in response to receiving at least one beam of light therein, and a reel assembly, including a reel body, an illuminating line spool disposed on at least a portion of the reel body to store the illuminating fishing line therein and illuminate a surrounding area therefrom, such that the illuminating line spool emits the at least one beam of light into the illuminating fishing line, and an illuminating bail disposed on at least a portion of the reel body to illuminate the surrounding area.

The illuminating fishing line may be constructed of a fiber optic cord.

The illuminating fishing line may be constructed of ultra-high molecular weight polyethylene.

The illuminating bail may receive the at least one beam of light from the illuminating line spool.

The illuminating bail may generate another at least one beam of light different from the at least one beam of light from the illuminating line spool.

The illuminating fishing device may further include a power button disposed on at least a portion of the reel body to turn on at least one of the illuminating line spool and the illuminating bail in response to being depressed a first time, turn off at least one of the illuminating line spool and the illuminating bail in response to being depressed a second time.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
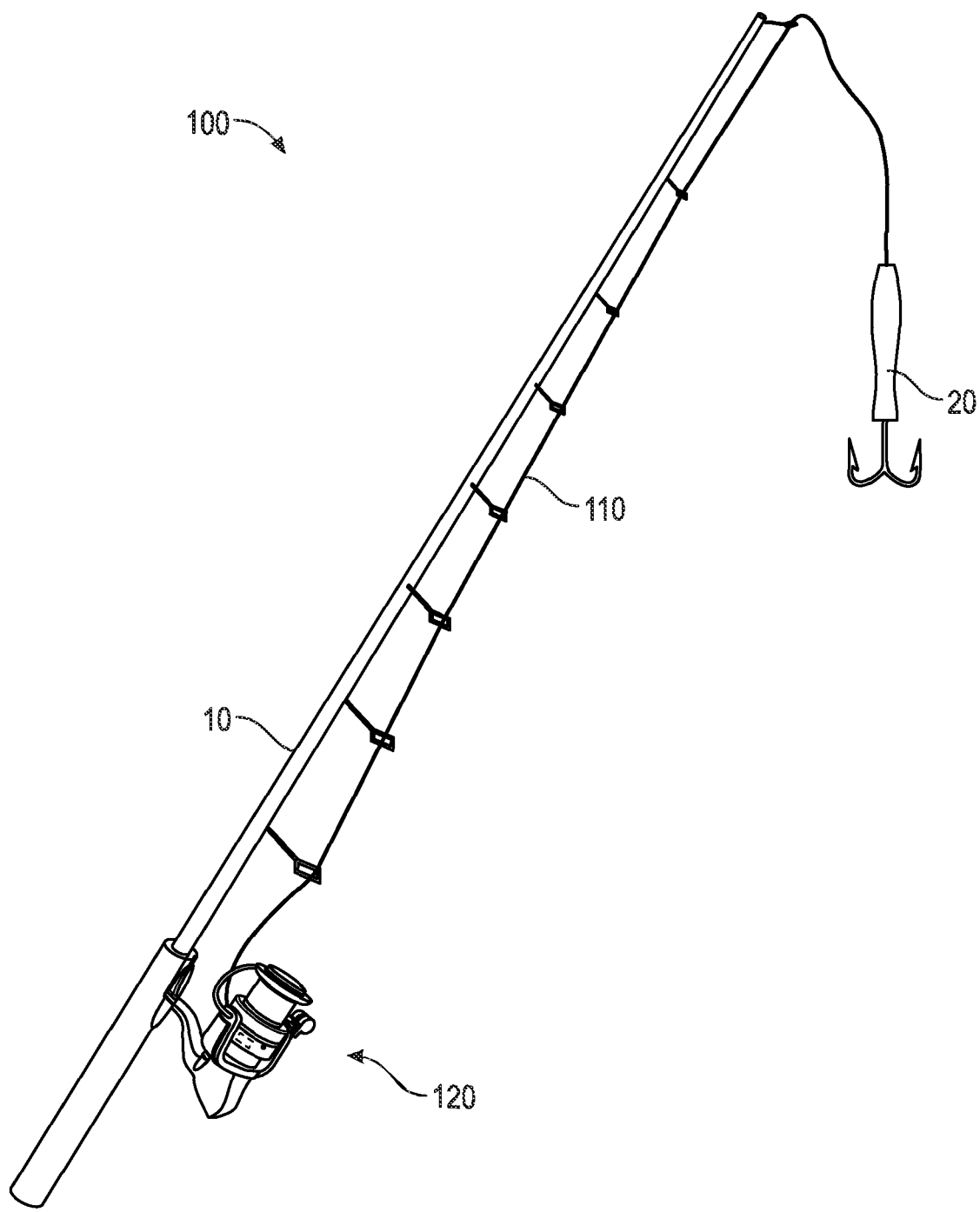
FIG. 1 illustrates a side perspective view of an illuminating fishing device, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Illuminating Fishing Device 100
Illuminating Fishing Line 110
Reel Assembly 120
Reel Body 121
Illuminating line spool 122
Illuminating bail 123
Power Source 124
Line Roller 125
Drag Adjuster 126
Reel Handle 127
Reel Foot 128
Anti-Reverse Switch 129
Power Button 130

FIG. 1 illustrates a side perspective view of an illuminating fishing device 100, according to an exemplary embodiment of the present general inventive concept.

Figure 2:
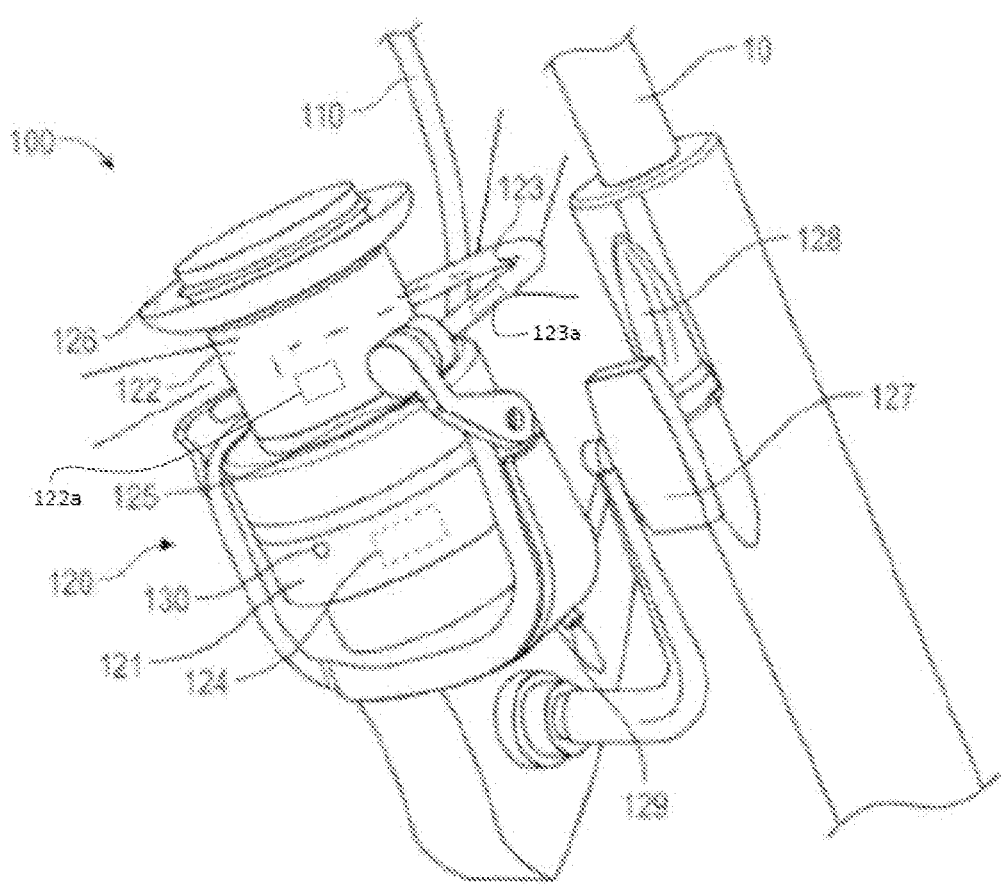
FIG. 2 illustrates a zoomed in view of the illuminating fishing device, according to an exemplary embodiment of the present general inventive concept.

FIG. 2 illustrates a zoomed in view of the illuminating fishing device 100, according to an exemplary embodiment of the present general inventive concept.

The illuminating fishing device 100 may be constructed from at least one of metal, plastic, wood, glass, and rubber, etc., but is not limited thereto.

The illuminating fishing device 100 may include an illuminating fishing line 110, a reel assembly 120, and a power button 130, but is not limited thereto.

The illuminating fishing line 110 may be constructed from nylon, polyethylene (e.g., ultra-high molecular weight polyethylene, which has high tensile strength and fifteen times stronger than steel of the same weight), glass (i.e., silica), and side glow fiber optic cord, but is not limited thereto. Also, the illuminating fishing line 110 may be braided and/or have fluorocarbon thereon.

The illuminating fishing line 110 may be removably connected to at least a portion of a fishing rod 10 and/or a fishing hook 20. The illuminating fishing line 110 may illuminate a surrounding area thereof. More specifically, the illuminating fishing line 110 may be a fiber optic line that illuminates in response to receiving at least one beam of light therein.

Additionally, the illuminating fishing line 110 may be a first fishing line to support a weight within a first predetermined range (e.g., two to twelve pounds). Alternatively, the illuminate fishing line 110 may be a second fishing line to support a weight within a second predetermined range (e.g., twelve to twenty-five pounds). The illuminate fishing line 110 may be used in freshwater and/or saltwater environments.

Referring to FIGS. 1 and 2, the reel assembly 120 is illustrated to have a spinning reel (a.k.a., open face reel) design. However, the reel assembly 120 may be a spincast reel (a.k.a., closed face reel), a bait casting reel, a fly reel, a centerpin reel, or any other type of reel known to one of ordinary skill in the art, but is not limited thereto.

The reel assembly 120 may include a reel body 121, an illuminating line spool 122, a line spool light source 122*a*, an illuminating bail 123, a bail light source 123*a*, a power source 124, a line roller 125, a drag adjuster 126, a reel handle 127, a reel foot 128, and an anti-reverse switch 129, but is not limited thereto.

The reel body 121 may be removably connected to at least a portion of the fishing rod 10.

The illuminating line spool 122 may include a light, an incandescent bulb, a light-emitting diode (LED), and a laser, but is not limited thereto.

The illuminating line spool 122 may be disposed on and/or within at least a portion of the reel body 121. Moreover, the illuminating line spool 122 may receive and/or store the illuminating fishing line 110 therein. The light within the illuminating line spool 122 may illuminate a surrounding area of the illuminating line spool 122 and/or the reel body 121. More specifically, the illuminating line spool 122 may be transparent to facilitate movement of light from an interior of the illuminating line spool 122 to an exterior environment.

Furthermore, the light from the illuminating line spool 122 may emit the at least one beam of light into the illuminating fishing line 110, such that the illuminating fishing line 110 may illuminate the surrounding area.

The illuminating bail 123 may include a light, an incandescent bulb, a light-emitting diode (LED), and a laser, but is not limited thereto.

The illuminating bail 123 may be disposed on at least a portion of the reel body 121 and/or connected to the illuminating line spool 122. The illuminating bail 123 may receive the at least one beam of light from the illuminating line spool 122. Alternatively, the illuminating bail 123 may generate another at least one beam of light therein different from the at least one beam of light from the illuminating line spool 122. Also, the illuminating bail 123 may allow the illuminating fishing line 110 to be extracted from the illuminating line spool 122 in response to being opened in a first position and prevent the illuminating fishing line 110 from being extracted from the illuminating line spool 122 in response to being closed in a second position. The illuminating bail 123 may illuminate the surrounding area.

The power source 124 may include a battery, a solar cell, and a charging port, but is not limited thereto.

The power source 124 may be disposed within at least a portion of the reel body 121. The power source 124 may charge the battery using the solar cell and/or an externally connected source, such as through the charging port. The power source 124 may provide power to the illuminating line spool 122 and/or the illuminating bail 123.

The line roller 125 may be disposed on at least a portion of the reel body 121 and/or the illuminating bail 123. The line roller 125 may facilitate movement of the illuminating fishing line 110 into the illuminating line spool 122 in response to retracting the illuminating fishing line 110. Also, the line roller 125 may prevent the illuminating fishing line 110 from becoming tangled while retracting.

The drag adjuster 126 may be movably (i.e., rotatably) disposed on at least a portion of the illuminating line spool 122. The drag adjuster 126 may increase a tension level of movement of the illuminating fishing line 110 through the illuminating line spool 122 in response to rotating in a first direction (i.e., clockwise) or a second direction (i.e. counterclockwise). Conversely, the drag adjuster 126 may decrease the tension level of movement of the illuminating fishing line 110 through the illuminating line spool 122 in response to rotating in the second direction or the first direction.

Furthermore, the drag adjuster 126 may be waterproof. The drag adjuster 126 may use a Josephson effect chip mode over a Josephson junction, such that a current moves therethrough without any voltage applied.

The reel handle 127 may be movably (i.e., rotatably) disposed on at least a portion of the reel body 121. The reel handle 127 may retract the illuminating fishing line 110 into the illuminating line spool 122 in response to rotating in a first direction (i.e., clockwise) or a second direction (i.e., counterclockwise). Conversely, the reel handle 127 may extract the illuminating fishing line 110 from the illuminating line spool 122 in response to rotating in the second direction or the first direction.

The reel foot 128 may be disposed on at least a portion of the reel body 121. The reel foot 128 may removably connect the reel body 121 to the fishing rod 10, such that the reel body 121 may be distanced away from the fishing rod 10.

The anti-reverse switch 129 may be disposed on at least a portion of the reel body 121. The anti-reverse switch 129 may prevent the reel handle 127 from rotating in the first direction or the second direction in response to being depressed a first time. Subsequently, the anti-reverse switch 129 may allow the reel handle 127 to rotate in the first direction or the second direction in response to being depressed a second time different from the first time. In other words, the anti-reverse switch 129 may allow the reel handle 129 to rotate in only one direction after being depressed the first time. During use, the anti-reverse switch 129 may prevent the reel handle 127 from rotating backwards which would otherwise allow the illuminating fishing line 110 to be extracted from the illuminating line spool 122.

The power button 130 may be disposed on at least a portion of the reel body 121. The power button 130 may turn on the illuminating line spool 122 and/or the illuminating bail 123 in response to being depressed a first time. Conversely, the power button 130 may turn off the illuminating line spool 122 and/or the illuminating bail 123 in response to being depressed a second time different from the first time.

Therefore, the illuminating fishing device 100 may facilitate fishing during night and/or low light conditions by improving visibility of the illuminating fishing line 110. Also, the illuminating fishing device 100 may prevent injury to a user during fishing due to being illuminated.

The present general inventive concept may include an illuminating fishing device 100 removably connected to at least a portion of a fishing rod 10, the illuminating fishing device 100 including an illuminating fishing line 110 to illuminate in response to receiving at least one beam of light therein, and a reel assembly 120, including a reel body 121, an illuminating line spool 122 disposed on at least a portion of the reel body 121 to store the illuminating fishing line 110 therein and illuminate a surrounding area therefrom, such that the illuminating line spool 122 emits the at least one beam of light into the illuminating fishing line 110, and an illuminating bail 123 disposed on at least a portion of the reel body 121 to illuminate the surrounding area.

The illuminating fishing line 110 may be constructed of a fiber optic cord.

The illuminating fishing line 110 may be constructed of ultra-high molecular weight polyethylene.

The illuminating bail 123 may receive the at least one beam of light from the illuminating line spool 122.

The illuminating bail 123 may generate another at least one beam of light different from the at least one beam of light from the illuminating line spool 122.

The illuminating fishing device 100 may further include a power button 130 disposed on at least a portion of the reel body 121 to turn on at least one of the illuminating line spool 122 and the illuminating bail 123 in response to being depressed a first time, turn off at least one of the illuminating line spool 122 and the illuminating bail 123 in response to being depressed a second time.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An illuminating fishing device removably connected to at least a portion of a fishing rod, the illuminating fishing device comprising:
   an illuminating fishing line to illuminate in response to receiving at least one beam of light therein; and
   a reel assembly, comprising:
      a reel body,
      an illuminating line spool disposed on at least a portion of the reel body to store the illuminating fishing line therein and illuminate a surrounding area therefrom in response to generating a first beam of light from an interior of the illuminating line spool, such that the illuminating line spool emits the first beam of light into the illuminating fishing line and from the interior of the illuminating line spool through an outer surface of the illuminating line spool, and
      an illuminating bail comprising a light therein, the illuminating bail disposed on at least a portion of the reel body to illuminate the surrounding area in response to generating a second beam of light from an interior of the illuminating bail and emitting the second beam of light through an outer surface of the illuminating bail.

* * * * *